United States Patent
Choi et al.

(10) Patent No.: US 10,423,067 B2
(45) Date of Patent: Sep. 24, 2019

(54) APPARATUS AND METHOD FOR GENERATING PHYSICAL UNCLONABLE FUNCTION BY MODIFYING PHOTO MASK OF SEMICONDUCTOR PROCESS

(71) Applicant: ICTK Holdings Co., Ltd., Seongnam-si (KR)

(72) Inventors: Byong Deok Choi, Seoul (KR); Dong Kyue Kim, Seoul (KR); Kwang Hyun Jee, Gyeonggi-do (KR)

(73) Assignee: ICTK Holdings Co., Ltd., Gyeonggi-do (KR)

( * ) Notice: Subject to any disclaimer, the term of this patent is extended or adjusted under 35 U.S.C. 154(b) by 0 days.

(21) Appl. No.: 14/915,102

(22) PCT Filed: Aug. 26, 2014

(86) PCT No.: PCT/KR2014/007908
§ 371 (c)(1),
(2) Date: Feb. 26, 2016

(87) PCT Pub. No.: WO2015/030454
PCT Pub. Date: Mar. 5, 2015

(65) Prior Publication Data
US 2016/0216605 A1 Jul. 28, 2016

(30) Foreign Application Priority Data
Aug. 27, 2013 (KR) .................... 10-2013-0101893

(51) Int. Cl.
*G06F 17/50* (2006.01)
*G03F 7/00* (2006.01)
(Continued)

(52) U.S. Cl.
CPC .............. *G03F 7/0035* (2013.01); *G03F 1/36* (2013.01); *G03F 1/44* (2013.01); *G03F 1/70* (2013.01);
(Continued)

(58) Field of Classification Search
CPC ....... H01L 2924/15311; H01L 21/8221; H01L 25/50; H01L 23/528; H01L 29/7851;
(Continued)

(56) References Cited

U.S. PATENT DOCUMENTS

2002/0052122 A1* 5/2002 Tanaka ..................... G03F 1/56
438/758
2002/0188924 A1 12/2002 Pierrat et al.
(Continued)

FOREIGN PATENT DOCUMENTS

JP 2010224192 A 10/2010
KR 1020090069096 A 6/2009
(Continued)

OTHER PUBLICATIONS

ISA Korean Intellectual Property Office, International Search Report Issued in Application No. PCT/KR2014/007908, dated Dec. 1, 2014, WIPO, 5 pages.
(Continued)

*Primary Examiner* — Binh C Tat
(74) *Attorney, Agent, or Firm* — McCoy Russell LLP

(57) ABSTRACT

Disclosed is a method of generating a physical unclonable function (PUF) by causing unpredictable partial process failure for a semiconductor process. In a designing process, a second mask pattern may be printed by distorting a size and/or shape of at least one mask window included in a designed first mask pattern, without violating semiconductor
(Continued)

design rules. A PUF may be generated using a photomask including the printed second mask pattern for photolithography.

10 Claims, 9 Drawing Sheets

(51) Int. Cl.
*H01L 21/027* (2006.01)
*G03F 1/36* (2012.01)
*G03F 1/70* (2012.01)
*G03F 1/44* (2012.01)
*G09C 1/00* (2006.01)
*H01L 21/311* (2006.01)

(52) U.S. Cl.
CPC ............ *G09C 1/00* (2013.01); *H01L 21/0274* (2013.01); *H01L 21/31144* (2013.01); *H04L 2209/12* (2013.01)

(58) Field of Classification Search
CPC .. H01L 21/0274; H01L 21/31144; G03F 1/70; G03F 1/50; G03F 7/0002; G03F 7/2022; G03F 7/70283; G03F 1/36; G03F 7/70441; G03F 7/705; G03F 1/84; G03F 1/44; G03F 7/70433; G03F 7/70625; G06F 17/5081; G06F 2217/12; G06F 17/5009; G06F 19/00; G06F 2217/14; G06F 17/5036; G06F 17/5068; G06F 17/50; G06F 7/0006
USPC ..................................... 716/50–56
See application file for complete search history.

(56) References Cited

U.S. PATENT DOCUMENTS

| | | |
|---|---|---|
| 2003/0204743 A1 | 10/2003 | Devadas et al. |
| 2004/0156030 A1* | 8/2004 | Hansen ................ G03F 7/701 355/67 |
| 2007/0009808 A1* | 1/2007 | Abrams ................ G03F 1/68 430/5 |
| 2007/0184357 A1* | 8/2007 | Abrams ................ G03F 1/36 430/5 |
| 2007/0186206 A1* | 8/2007 | Abrams ................ G03F 1/36 716/52 |
| 2010/0241261 A1 | 9/2010 | Taguchi et al. |
| 2011/0209106 A1* | 8/2011 | Cheng .................. G03F 1/38 716/55 |

FOREIGN PATENT DOCUMENTS

| | | |
|---|---|---|
| KR | 1020110077897 A | 7/2011 |
| KR | 1020110077959 A | 7/2011 |
| KR | 101139630 B1 | 5/2012 |
| TW | 200510945 A | 3/2005 |
| TW | 201225614 A1 | 6/2012 |
| WO | 2013025060 A2 | 2/2013 |

OTHER PUBLICATIONS

Forte, D. et al., "On Improving the Uniqueness of Silicon-Based Physically Unclonable Functions Via Optical Proximity Correction," Proceedings of the 49th ACM/EDAC/IEEE Design Automation Conference, Jun. 3, 2012, San Francisco, California, 10 pages.
European Patent Office, Extended European Search Report Issued in Application No. 14839686.4, dated Mar. 29, 2017, Germany, 5 pages.
European Patent Office, Office Action Issued in Application No. 14839686.4, dated May 20, 2018, Germany, 6 pages.

* cited by examiner

APPARATUS AND METHOD FOR GENERATING PHYSICAL UNCLONABLE FUNCTION BY MODIFYING PHOTO MASK OF SEMICONDUCTOR PROCESS

CROSS REFERENCE TO RELATED APPLICATIONS

The present application is a U.S. National Phase of International Patent Application Serial No. PCT/KR2014/007908, entitled "METHOD AND APPARATUS FOR GENERATING PUF BY TRANSFORMING PHOTO MASK IN SEMICONDUCTOR PROCESS," filed on Aug. 26, 2014, which claims priority to Korean Patent Application No. 10-2013-0101893, entitled "METHOD AND APPARATUS FOR GENERATING PUF BY TRANSFORMING PHOTO MASK IN SEMICONDUCTOR PROCESS," filed on Aug. 27, 2013, the entire contents of each of which are hereby incorporated by reference for all purposes.

TECHNICAL FIELD

The present invention relates to a semiconductor process, and more particularly to a method of generating a physically unclonable function (PUF) by modifying a photomask used for photolithography in a semiconductor process.

BACKGROUND ART

A physically unclonable function (PUF) may provide an unpredictable digital value. Each individual PUF provides a different digital value even when the exact manufacturing process is given and the same design and the same process are used.

Thus, a PUF may also be referred to as a physical one-way function practically impossible to be duplicated (POWF).

Such a PUF characteristic may be used for generating an encryption key for security and/or authentication. For example, a PUF may be utilized to provide a unique key to distinguish devices from one another.

KR Patent Registration No. 10-1139630 (hereinafter, "Patent 630") discloses a PUF embodying method. Patent 630 presents a method for stochastically determining using a process variation whether an inter-layer contact or via is formed between semiconductor conductive layers.

DISCLOSURE OF INVENTION

Technical Solutions

According to an aspect of the present invention, there is provided a semiconductor manufacturing method including printing a second mask pattern, obtained by modifying at least part of a first mask pattern corresponding to a semiconductor design, when the first mask pattern is input; and conducting photolithography using a photomask including the printed second mask pattern, wherein the second mask pattern is formed by modifying the first mask pattern such that a plurality of inter-layer contacts or vias included in the semiconductor design is formed stochastically and accordingly at least part of the inter-layer contacts or vias are not formed.

The second mask pattern may be formed by modifying or distorting at least one of a size and a shape of at least one mask window included in the first mask pattern.

The inter-layer contacts or vias may be formed at a first threshold yield or higher by photolithography using the first mask pattern and are formed at a yield ranging from a second threshold yield to a third threshold yield by photolithography using the second mask pattern, the third threshold yield is smaller than the first threshold yield, and the second threshold yield is smaller than the third threshold yield.

The second mask pattern may be formed by down-scaling a size of at least one mask window included in the first mask pattern by applying a scale factor smaller than 1 to the at least one mask window.

The second mask pattern may be formed by distorting a shape of at least one mask window included in the first mask pattern by modifying the shape of the at least one mask window in at least one direction.

The second mask pattern may be formed by distorting at least one mask window included in the first mask pattern by omitting optical proximity correction (OPC) or applying modified OPC to the at least one mask window.

According to another aspect of the present invention, there is provided a semiconductor manufacturing method including receiving a first mask pattern designed to form a plurality of inter-layer contacts or vias between semiconductor conductive layers; and forming a second mask pattern by distorting the first mask pattern such that at least part of the inter-layer contacts or vias is not stochastically implanted, wherein when photolithography using the second mask pattern is performed, a difference in proportion between unformed inter-layer contacts or vias and formed inter-layer contacts or vias to short-circuit the semiconductor conductive layers among the inter-layer contacts or vias is a first threshold or lower.

The second mask pattern may be formed by down-scaling a size of at least one mask window included in the first mask pattern by applying a scale factor smaller than 1 to the at least one mask window.

The second mask pattern may be formed by distorting a shape of at least one mask window included in the first mask pattern by modifying the shape of the at least one mask window in at least one direction.

The second mask pattern may be formed by distorting at least one mask window included in the first mask pattern by omitting OPC or applying modified OPC to the at least one mask window.

According to still another aspect of the present invention, there is provided a semiconductor manufacturing method including receiving a first mask pattern involved in a process of implanting N inter-layer contacts designed to short-circuit semiconductor conductive layers, N being a natural number and the first mask pattern including N mask windows corresponding to the respective N inter-layer contacts; and forming a second mask pattern by modifying or distorting at least one of a shape and a size of the N mask windows in the first mask pattern, wherein when the process of implanting the N inter-layer contacts between the conductive layers is performed using the second mask pattern, it is stochastically determined whether each of the N designed inter-layer contacts short-circuits the conductive layers.

The modifying or distorting may include changing at least one of the shape and size of the N mask windows such that a difference between proportion of inter-layer contacts short-circuiting the conductive layers and proportion of inter-layer contacts not short-circuiting the conductive layers among the N designed inter-layer contacts is smaller than a first threshold.

According to yet another aspect of the present invention, there is provided a semiconductor mask forming apparatus including a processing unit to form a second mask pattern by modifying or distorting a first mask pattern designed to implant a plurality of inter-layer contacts between semiconductor conductive layers such that at least part of the inter-layer contacts is not stochastically implanted when the first mask pattern is input; and a print unit to print the second mask pattern, wherein when photolithography is performed, the second mask pattern is formed by modifying or distorting at least one of a size and a shape of at least part of mask windows included in the first mask pattern such that a difference in proportion between inter-layer contacts not implanted and inter-layer contacts implanted to short-circuit the semiconductor conductive layers among the inter-layer contacts is a first threshold or lower The processing unit may form the second mask pattern by down-scaling a size of at least one mask window included in the first mask pattern by applying a scale factor smaller than 1 to the at least one mask window.

The processing unit may form the second mask pattern by distorting a shape of at least one mask window included in the first mask pattern by modifying the shape of the at least one mask window in at least one direction.

The processing unit may form the second mask pattern by distorting at least one mask window included in the first mask pattern by omitting OPC or applying modified OPC to the at least one mask window.

BEST MODE FOR CARRYING OUT THE INVENTION

Figure 1:
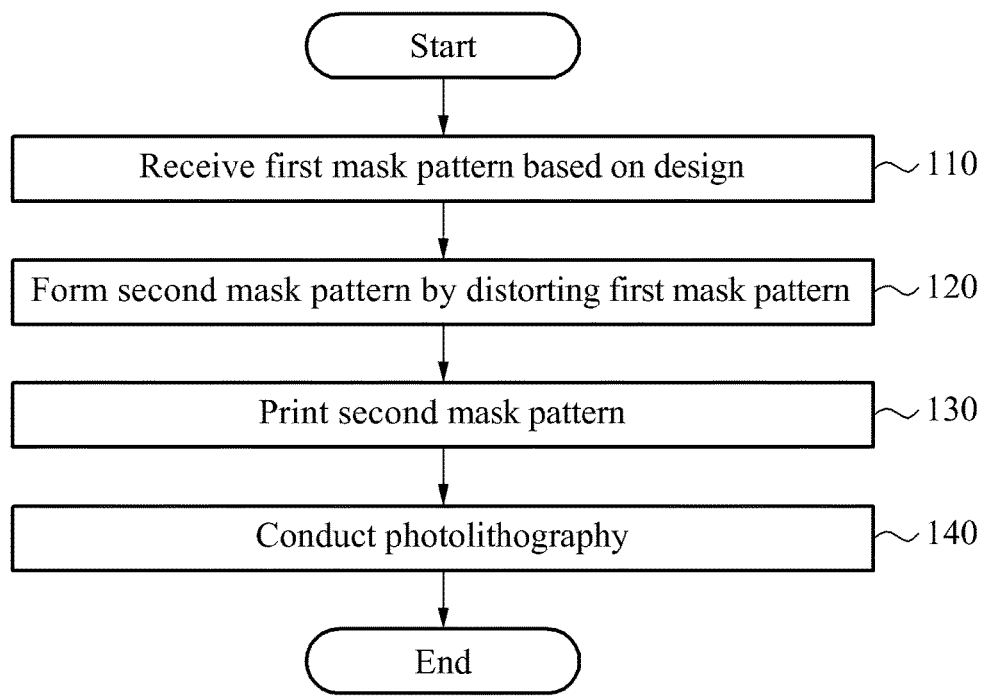
FIG. 1 is a flowchart illustrating a semiconductor manufacturing method according to an embodiment.

Hereinafter, exemplary embodiments will be described in detail with reference to the accompanying drawings. These embodiments, however, are provided to restrictive or limiting purposes. Like reference numerals refer to the like elements throughout.

FIG. 1 is a flowchart illustrating a semiconductor manufacturing method according to an embodiment.

In operation 110, a first mask pattern based on a semiconductor design is received. The first mask pattern may be a photomask pattern for forming (or implanting) a plurality of inter-layer contacts designed to short-circuit semiconductor conductive layers.

Here, throughout the specification, the inter-layer contacts refer to a conductive element in a random form which short-circuits nodes made with a conductive material. For instance, it should be understood that vias implanted between the conductive layers are also included in the inter-layer contacts described in this specification.

Thus, an "inter-layer contact" should be interpreted as including any form which is capable of short-circuiting conductive layers in a semiconductor circuit, without being limited to a few components illustrated in the specification.

According to the embodiment, the first mask pattern may include N mask windows associated with N inter-layer contacts implanted between the semiconductor conductive layers, wherein N is a natural number. The N mask windows may be part of the first mask pattern. This part may correspond with a region for generating a physical unclonable function (PUF) among the inter-layer contacts involved in the process.

The N mask holes or windows included in the first mask pattern may be provided for the semiconductor process, for example, photolithography.

Here, the first mask pattern may ensure that the N inter-layer contacts are successfully implanted between the semiconductor conductive layers by a general process based on the semiconductor design.

Thus, when the N inter-layer contacts are implanted using a photomask formed using the first mask pattern, the N inter-layer contacts each may short-circuit the semiconductor conductive layers.

According to the embodiment, in operation 120, a second mask pattern is generated by modifying or distorting a size and/or shape of the N mask windows included in the first mask pattern.

For instance, modifying or distorting may mean changing the size of each of the N mask windows in the first mask pattern small, without being limited thereto. Thus, a size of each of N mask windows include in the second mask pattern may be smaller than the size of each of the N mask windows included in the first mask pattern.

In operation 130, a photo mask to be used for photolithography in the process is generated by printing the second mask pattern. Printing may be understood as physically forming a chrome pattern corresponding to the second mask pattern on glass for generating the mask.

In operation 140, when photolithography is performed, at least random part of the N inter-layer contacts involved in generating the PUF may be unable to short-circuit the semiconductor conductive layers.

Such a result may be considered as process failure in a general semiconductor process. Moreover, as part of the designed inter-layer contacts are not properly implanted, a semiconductor may be considered defective.

In the embodiment, however, the PUF is generated using a result that random and unpredictable part of the inter-layer contacts is unable to short-circuit the semiconductor conductive layers (which is considered as a failure in the general semiconductor manufacturing process).

This random process failure is due to that part of the N mask window does not allow photoresist (PR) seated on an interlayer to be sufficiently developed to the interlayer in the subsequent photolithography process so that the interlayer is not etched.

The process failure may also arise because even through the PR is developed, an exposed area of the interlayer to an etching solution is small so that the entire interlayer may not be etched in the etching process.

As described above, as the size and/or shape of the mask windows are modified or distorted in the process, part of the N inter-layer contacts do not short-circuit the semiconductor conductive layers. In this case, it is impossible to predict which of the N inter-layer contacts is unable to short-circuit the semiconductor conductive layers, which secures randomness of an N-bit digital value generated by the PUF.

Meanwhile, after the process is conducted once, the specific part of the N inter-layer contacts which does not short-circuit the semiconductor conductive layers remains the same without a separate process. Thus, time-invariance of the N-bit digital value generated by the PUF may be ensured high.

Furthermore, although the process is carried out a plurality of times using the same second mask pattern to generate a plurality of PUFs, there changes which of the N inter-layer contacts fails to be properly implanted.

Thus, as different digital values are generated despite using the same second mask pattern, a characteristic of the PUF, that is, physical unclonabiliy, may be satisfied.

According to embodiments, the N mask windows formed on the glass in manufacture of the mask are generated in the second design pattern, modified from the original design corresponding to the first mask pattern, and accordingly the inter-layer contacts are not implanted in a random part after photolithography is subsequently conducted. The PUF is generated by randomness of success of implantation of the N inter-layer contacts.

Distortions of a mask pattern will be described in detail with reference to diverse embodiments below.

Figure 2:
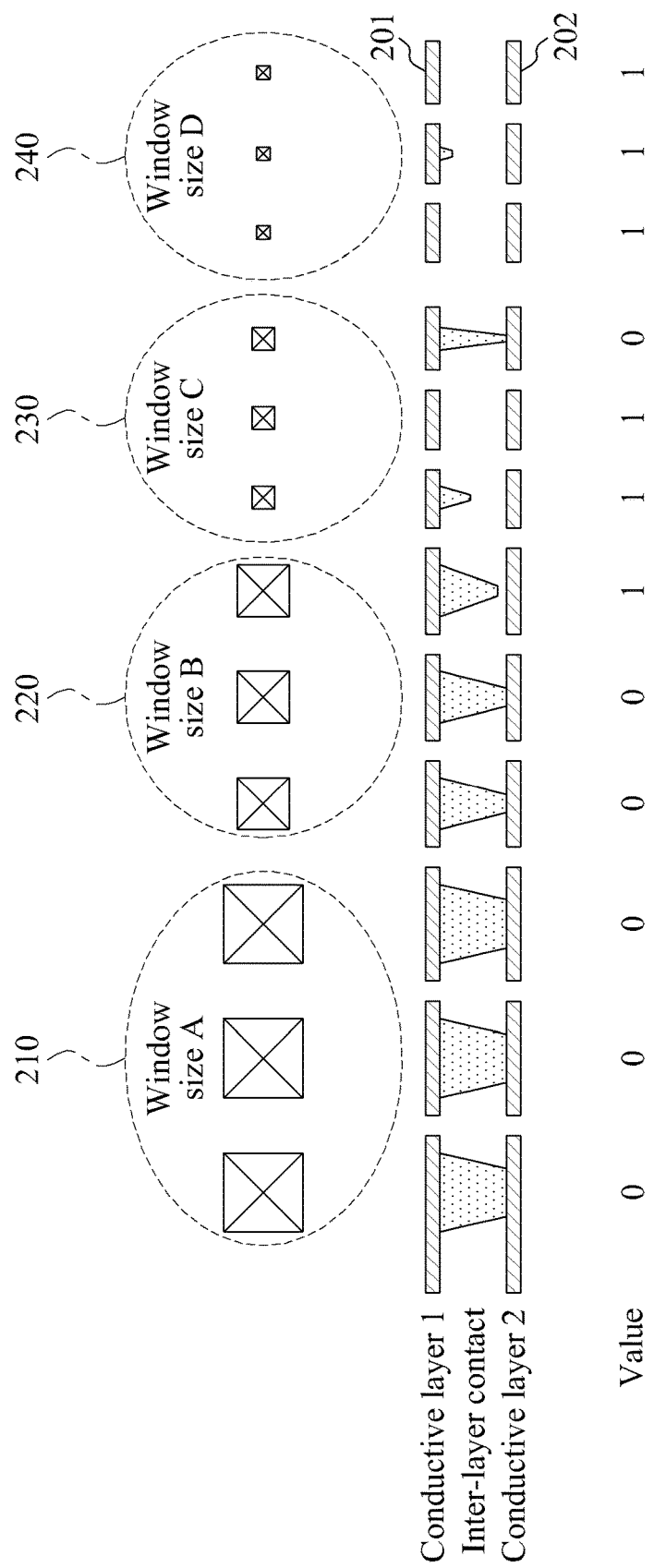
FIG. 2 is a diagram illustrating a process for generating a physical unclonable function (PUF) by distorting a mask window size in the semiconductor manufacturing method according to an embodiment.

FIG. 2 is a diagram illustrating a process for generating a PUF by distorting a size of a mask window in a semiconductor manufacturing process according to an embodiment.

Four mask window groups 210, 220, 230 and 240 for implanting inter-layer contacts, that is, vias, between a conductive layer 201 and a conductive layer 202 in the semiconductor manufacturing process are shown.

Mask windows included in a group 210 may be mask windows included in a first mask pattern for a general photolithography process.

When the photolithography process is performed by forming the mask windows in the group 210 on a photomask, three inter-layer contacts are successfully implanted. Thus, the conductive layer 201 and the conductive layer 202 are short-circuited at each node. In this case, digital values generated by three nodes may be "000."

Meanwhile, mask windows included in a group 240 may be formed by drastically reducing a size of the mask windows in the group 210.

When the general photolithography process is performed by printing the mask windows in the group 240 on a photomask, any of the three inter-layer contacts is not successfully implanted. Part of the mask windows in the group 240 does not allow PR be completely developed up to an interlayer in a developing process, so that the interlayer may not be exposed to an etching solution. Alternatively, although part of the mask windows allows PR to be developed to the interlayer, an exposed area of the interlayer to the etching solution is too small, so that the entire interlayer is not etched.

Thus, the group 240 does not short-circuit the conductive layer 201 and the conductive layer 202 at each node. In this case, digital values generated by three nodes may be "111."

When a mask window size B or C is selected between the size A of the mask windows in the group 210 which allows all of the contacts to be successfully implanted and a size D of the mask windows in the group 240 which does not allow any inter-layer contact to be successfully implanted, some inter-layer contacts determined stochastically and unpredictable may be expected to be successfully implanted and remaining inter-layer contacts may be expected not to be properly implanted.

A size B of mask windows in a group 220 may be selected as such.

When the general photolithography process is performed by forming the mask windows in the group 220 on a photomask, two of three inter-layer contacts are successfully implanted, while remaining one inter-layer contact is not properly implanted. Thus, the conductive layer 201 and the conductive layer 202 are short-circuited at part of nodes but are not short-circuited at a remaining node. In this case, digital values generated by three nodes may be "001."

Here, the mask windows in the group 220 may be the mask windows included in the second mask pattern according to the embodiment.

A size C of mask windows in a group 230 may be smaller than the size B. In this case, at one node, PR is developed to the interlayer but does not etch the entire interlayer due to a too small area of the interlayer being exposed to the etching solution. Further, at another node, the PR is not completely developed to the interlayer in the developing process so that the interlayer is not exposed to the etching solution, while at a third node, etching is achieved so that the conductive layer 201 and the conductive layer 202 are short-circuited. In this case, digital values generated by the three nodes may be "110."

As such, by modifying the size and/or shape of the mask windows, unpredictable random part of the inter-layer contacts may be successfully implanted between the conductive layers 201 and 202 and remaining inter-layer contacts may not be successfully implanted, thereby generating PUFs.

Effects of mask window size distortions in the photolithography process will be described in detail with reference to FIG. 3.

Figure 3:
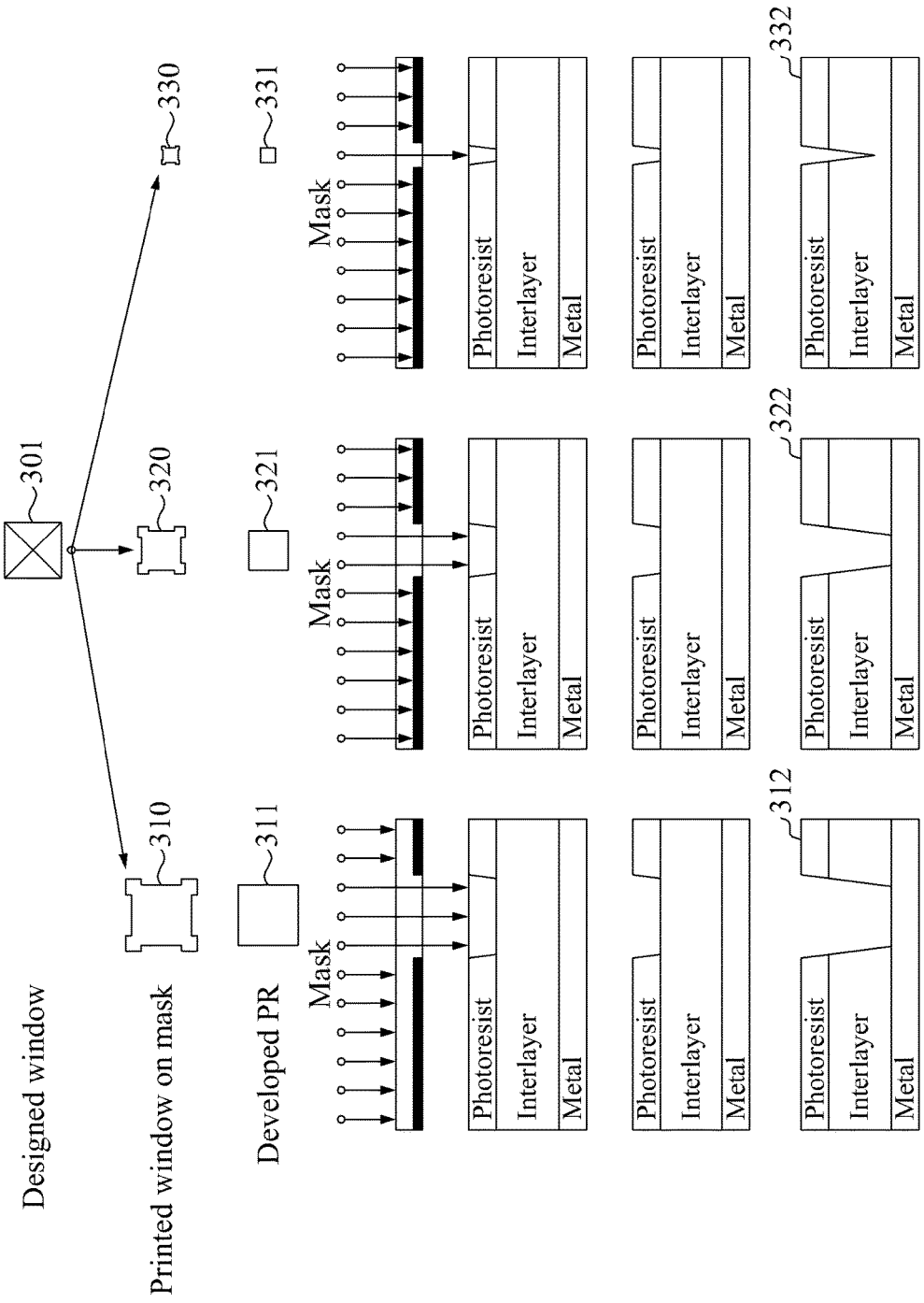
FIG. 3 is a diagram illustrating a process for stochastically determining successful implantation of an inter-layer contact by distorting a mask window size according to an embodiment.

FIG. 3 is a diagram illustrating a process for stochastically determining successful implantation of inter-layer contacts by distorting a size of a mask window according to an embodiment.

A mask window 310 is formed on a photomask according to a design 301 for generating a single inter-layer contact in a general process.

For instance, in the general process, optical proximity correction (OPC) may be carried out, and the mask window 310 is subjected to OPC to have a size and shape so as to develop PR in the same size and shape as those of the design 301. OPC is generally known to semiconductor engineers and thus will not be described in detail.

The mask window 310 may be included in the aforementioned first mask pattern and allows the PR to be developed in a sufficient size so that the PR on an interlayer has a shape 311. As a result of developing and etching the PR included in the photolithography process, the PR is formed as shown in a picture 312, in which case all inter-layer contacts may be successfully implanted.

Meanwhile, a mask window 330 is formed by drastically reducing a size of the mask window 310 included in the first mask pattern and allows the PR to be developed into a shape

331. As a result of developing and etching the PR, the PR is formed as shown in a picture 332, in which case most inter-layer contacts may fail to be implanted.

In the embodiment, a second mask pattern is generated by selecting a mask window 320. Using the mask window 320, the PR is developed with a distorted shape 321 having a smaller size than a normal size. As a result of developing and etching the PR, the PR is formed as shown in a picture 322. In this case, the mask window 320 may be formed to have a probability that inter-layer contacts are successfully implanted being 50%.

For example, if the normal mask window 310 has a size of 0.25 μm in a 0.18-micron (μm) complementary metal-oxide-semiconductor (CMOS) process, the mask window 320 of the second mask pattern according to the invention may have a size of 0.19 μm.

The values present above are provided for illustrative purposes only and may change depending on semiconductor manufacturers and process factors. Thus, a short circuit probability of conductive layers being about 50% by successful implantation of the inter-layer contacts may be achieved by testing with diverse sizes of mask windows, and a determined size of a mask window may be used for modifying the mask window according to embodiments.

Meanwhile, as illustrated with reference to the group 230 or the group 240 in FIG. 2, the PR developing process is incompletely performed due to a too small size of the mask windows, so that the PR may not be thoroughly developed to the interlayer (not shown). In this case, the interlayer may not be etched at all, unlike the picture 322.

Figure 4:
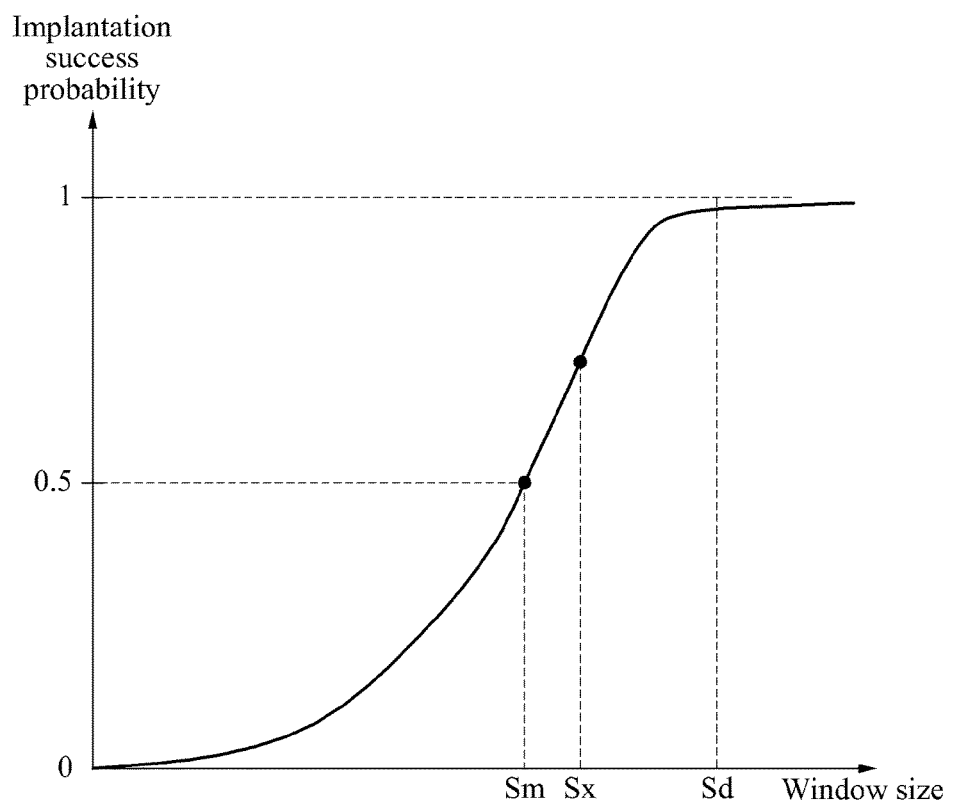
FIG. 4 is a graph illustrating distortion degree of a mask window size for adjusting a probability of an inter-layer contact being successfully implanted according to an embodiment.

FIG. 4 is a graph illustrating distortion degree of a size of a mask window for adjusting a probability of an inter-layer contact being successfully implanted according to an embodiment.

The graph shows that as the size of the mask window increases, the successful implantation probability is close to 1. In the general semiconductor process, the size of the mask window may be set to Sd so that contacts are implanted at a first threshold yield or higher.

Sm is a mask window size for achieving a theoretical probability that inter-layer contacts are successfully implanted being 0.5, which varies depending on a process. Even though a maximally close value may be obtained by experiments, it is difficult to find the exact Sm.

Thus, in the embodiment, a mask window size Sx is selected by specific experiments so as to achieve a probability that the inter-layer contacts are successfully implanted being sufficiently close to 0.5.

In this case, Sx may be determined so that the successful implantation probability, that is, a yield, is within a certain range around 0.5. For instance, an actual Sx value may be determined as a value between a window size enabling the successful implantation probability to be a second threshold yield of 0.45 and a window size enabling the successful implantation probability to be a third threshold yield of 0.55.

Meanwhile, although the mask window size Sx with the successful implantation probability being close to 0.5 is determined by experiments, a real successful implantation probability may not be 50% after the process finishes, which may be due to effects of various process factors.

In the embodiment, N inter-layer contacts are generated and grouped into k groups, wherein k is a natural number.

Accordingly, each individual group may include N/k inter-layer contacts. Comparing N/k-bit digital values generated respectively by two groups, a 1-bit digital value representing the two groups may be determined as "0" or "1."

The foregoing process is interpreted as conducting a process of balancing between the digital values "0" and "1" in PUFs to be practically used.

Hereinafter, an inter-layer contact design for realizing a PUF, a first mask pattern by a general process and a second mask pattern according to embodiments will be described in detail with reference to FIGS. 5 to 8.

Figure 5:
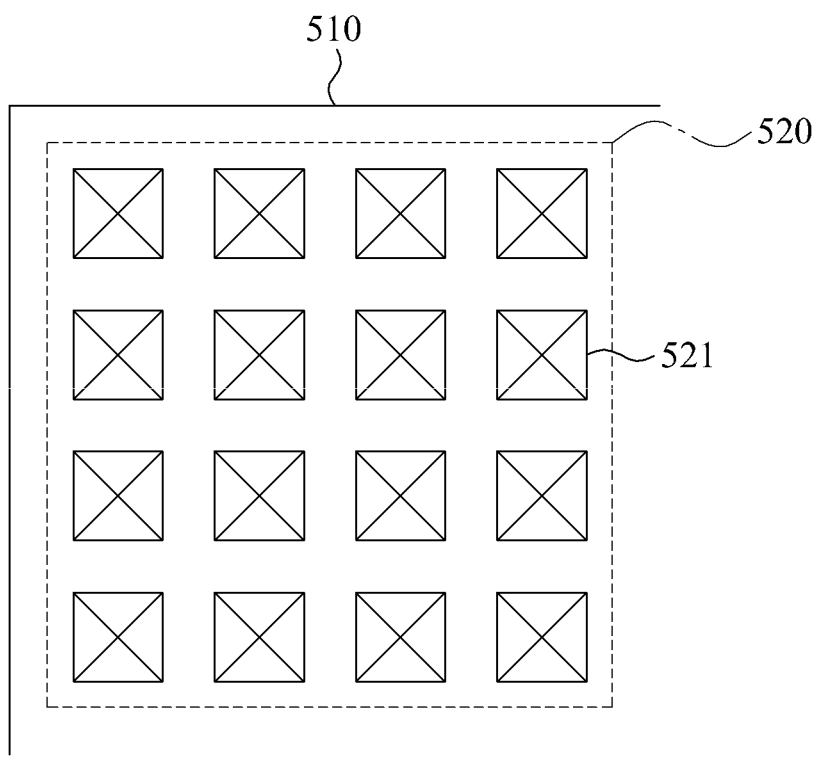
FIG. 5 illustrates a mask pattern design corresponding to a plurality of designed inter-layer contacts according to an embodiment.

FIG. 5 illustrates a mask pattern design corresponding to a plurality of inter-layer contacts designed according to an embodiment.

A semiconductor design 510 may include a PUF forming part 520. The PUF forming part 520 may be hidden in a generate integrated circuit, which may make it difficult to find the PUF forming part 520 even by analysis of a semiconductor integrated circuit with X-ray.

For example, 16 inter-layer contacts 521 are designed in the PUF forming part 520. A first mask pattern generally used for implanting the 16 inter-layer contacts by photolithography according to this design is illustrated in FIG. 6.

Figure 6:
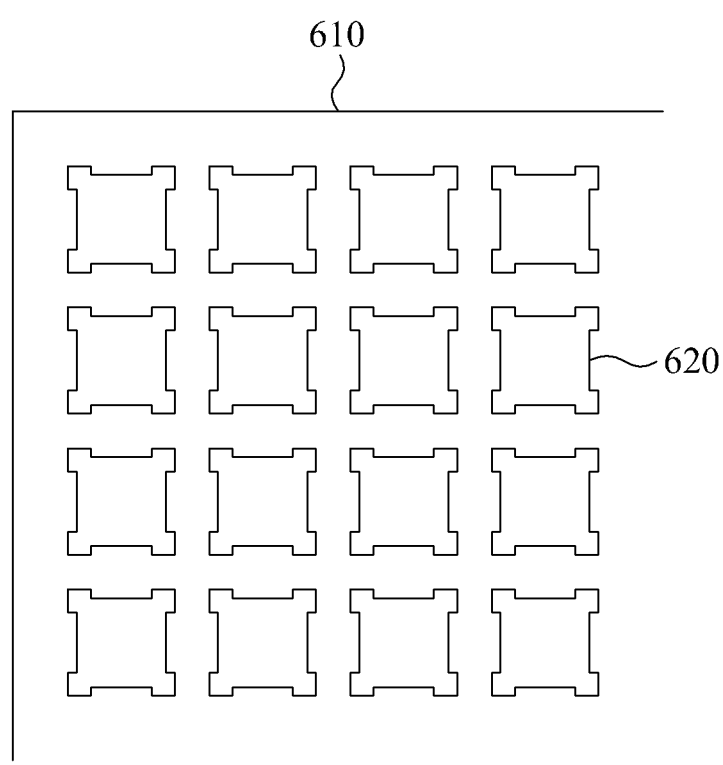
FIG. 6 illustrates a first mask pattern corresponding to the mask pattern design of FIG. 5 according to an embodiment.

FIG. 6 illustrates the first mask pattern 610 corresponding to the mask pattern design of FIG. 5 according to an embodiment.

16 mask windows 620 are illustrated corresponding to the 16 inter-layer designs of FIG. 5. For example, OPC is applied to the mask windows 620.

In one embodiment, a second mask pattern is generated by modifying the first mask pattern 610. An example of the second mask pattern is shown in FIG. 7.

Figure 7:
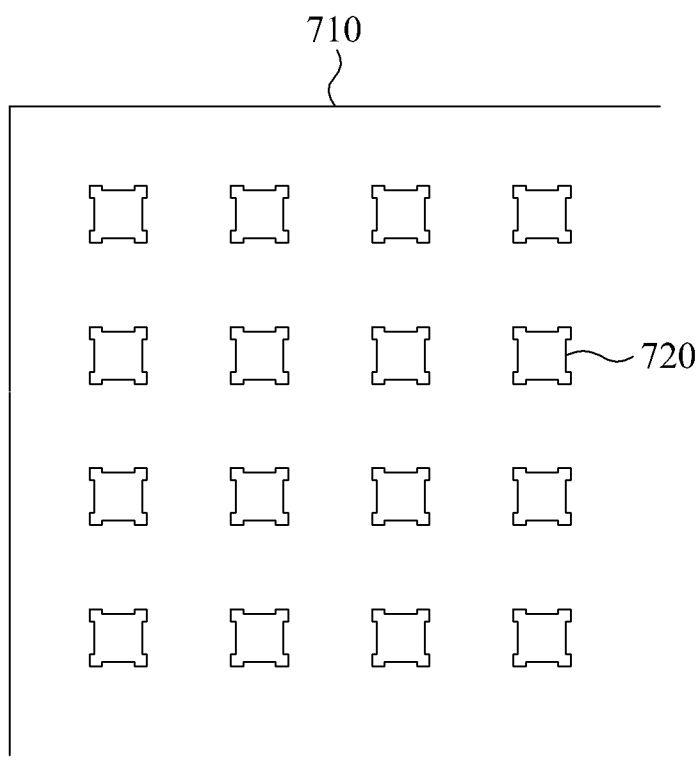
FIG. 7 illustrates a second mask pattern formed by distorting a size of mask windows of the first mask pattern of FIG. 6 according to an embodiment.

FIG. 7 illustrates the second mask pattern 710 formed by distorting a size of the mask windows of the first mask pattern of FIG. 6 according to an embodiment.

16 mask windows 720 included in the second mask pattern 710 are obtained by distorting a size and/or shape of each of the 16 mask window 620 of the first mask pattern 610. According to one embodiment, distortion may be down-scaling the size of each mask window 620. In this embodiment, only mask windows corresponding to the PUF forming part 520 of FIG. 5 may be down-scaled, and other parts (not shown) not related to PUF formation may be subjected to the general process.

Down-scaling is provided as an illustrative example of distortion only, and the distortion may include various embodiments.

Figure 8:
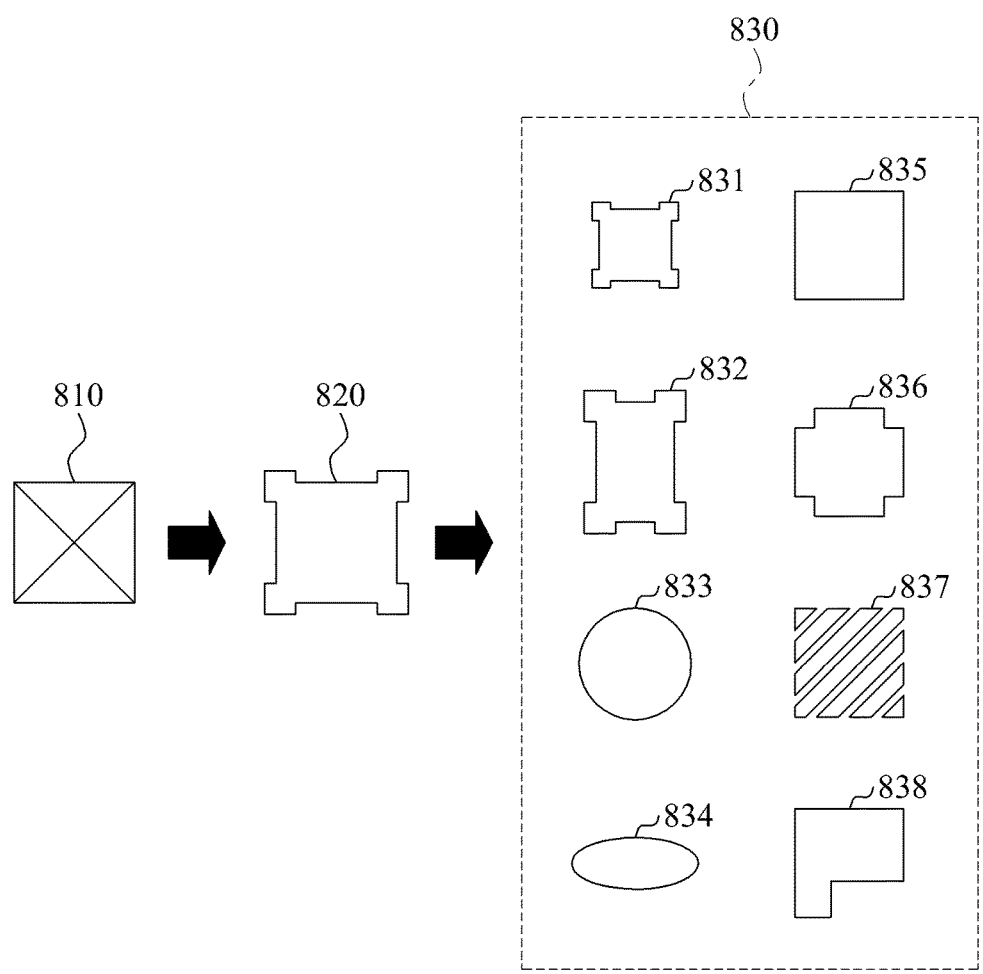
FIG. 8 illustrates mask windows distorted according to diverse embodiments.

FIG. 8 illustrates mask windows 830 distorted according to diverse embodiments.

Mask windows 830 obtained by distorting a mask window 820, formed by a conventional process corresponding to one inter-layer design 810, according to various methods are illustrated. In addition to these illustrative shapes of the mask windows 830, other alternative embodiments may be obvious to those skilled in the art.

In one embodiment, a mask window 831 may be generated by down-scaling the mask window 820, as illustrated in FIG. 7.

Alternatively, a mask window 832 may be generated by reducing a size of the mask window 820 in at least one direction.

A mask window 833 or a mask window 834 may be also generated by modifying the size and shape of the mask window 820.

A mask window 835 may be generated by omitting OPC to be applied to the mask window 820.

A mask window 836 may be generated by applying an inverse OPC pattern to the mask window 820.

A mask window 837 may be generated by inserting a lattice pattern in the mask window 820 to reduce a window area.

Also, a mask window 837 may be generated by removing at least part of the mask window 820.

As described above, it should be noted that the mask windows 830 include any modification which causes random and stochastic process failure so that a probability that inter-layer contacts are successfully implanted between semiconductor conductive layers is close to 50%.

When an N number of the same modified mask windows selected among the foregoing embodiments are patterned to generate a photomask, a modification may be formed without violating semiconductor design rules in a design process, thereby generating a PUF in the process.

Thus, the conventional semiconductor process may be used as it without involving additional manufacture costs, and a PUF physically unclonable and strong against external attacks may be manufactured.

Figure 9:
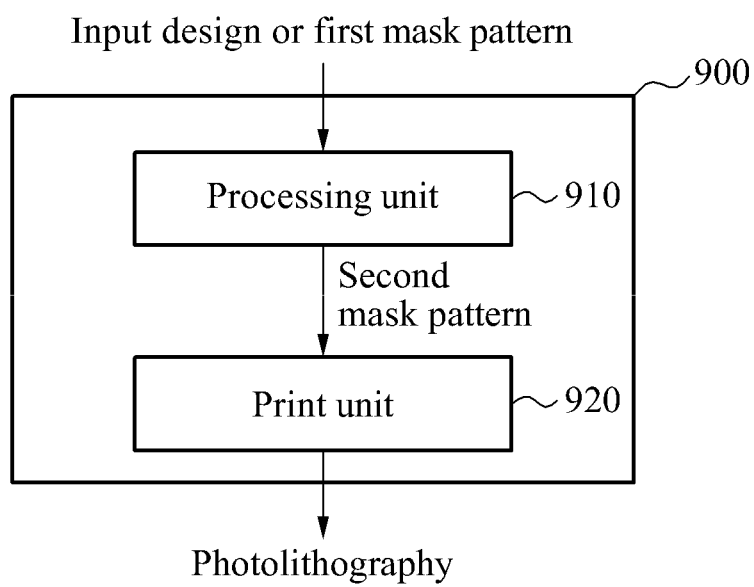
FIG. 9 illustrates a semiconductor mask forming apparatus according to an embodiment.

FIG. 9 illustrates a semiconductor mask forming apparatus 900 according to an embodiment.

According to the embodiment, the design 510 of FIG. 5 or the first mask pattern of FIG. 6 is input to a processing unit 910 of the apparatus 900.

The processing unit generates a second mask pattern by distorting the size and/or shape of the N mask windows included in the first mask pattern.

Various embodiments of distortion have been illustrated with reference to FIGS. 5 to 8.

When the second mask pattern is generated by the processing unit 910, a print unit 920 prints the second mask pattern to generate a photomask to be used for photolithography.

When general photolithography is carried out using the photomask, at least part of the N inter-layer contacts according to the original design does not short-circuit semiconductor conductive layers, as described above.

Inter-layer contacts successfully implanted among the N inter-layer contacts may be identified using a read transistor (not shown), and a PUF generating an N-bit digital value may be generated using an identified value.

Furthermore, various types of post-processing may be additionally carried out for balancing the thus generated digital value between "0" and "1."

While a few exemplary embodiments have been shown and described with reference to the accompanying drawings, it will be apparent to those skilled in the art that various modifications and variations can be made from the foregoing descriptions. For example, adequate effects may be achieved even if the foregoing processes and methods are carried out in different order than described above, and/or the aforementioned elements, such as systems, structures, devices, or circuits, are combined or coupled in different forms and modes than as described above or be substituted or switched with other components or equivalents.

Thus, other implementations, alternative embodiments and equivalents to the claimed subject matter are construed as being within the appended claims.

The invention claimed is:

1. A semiconductor manufacturing method comprising:
generating a second mask pattern via a processing unit by modifying at least a size of a mask window of a first mask pattern, wherein the second mask pattern is formed by distorting at least one mask window comprised in the first mask pattern by omitting optical proximity correction (OPC) or applying modified OPC to the at least one mask window;
wherein the size of the mask window is selected from a size range having a desired probability that inter-layer contacts or vias formed using the second mask pattern have a desired probability of successfully connecting two conductive layers and the desired probability is less than a probability of successful connection when using the first mask pattern;
fabricating the second mask pattern by printing, via a print unit, the second mask pattern on a photomask having the modified mask window; and
conducting photolithography using the photomask to form a plurality of inter-layer contacts or vias stochastically and accordingly at least part of the inter-layer contacts or vias is not formed.

2. The semiconductor manufacturing method of claim 1, wherein the second mask pattern is further formed by modifying or distorting a shape of the mask window comprised in the first mask pattern.

3. The semiconductor manufacturing method of claim 1, wherein the inter-layer contacts or vias are formed at a first threshold yield or higher by photolithography using the first mask pattern and are formed at a yield ranging from a second threshold yield to a third threshold yield by photolithography using the second mask pattern, wherein the third threshold yield is smaller than the first threshold yield, and the second threshold yield is smaller than the third threshold yield.

4. The semiconductor manufacturing method of claim 1, wherein the second mask pattern is formed by down-scaling a size of at least one mask window comprised in the first mask pattern by applying a scale factor smaller than 1 to the at least one mask window.

5. The semiconductor manufacturing method of claim 1, wherein the second mask pattern is formed by distorting a shape of at least one mask window comprised in the first mask pattern by modifying the shape of the at least one mask window in at least one direction.

6. A semiconductor manufacturing method comprising:
receiving a first mask pattern designed to form a plurality of inter-layer contacts or vias between semiconductor conductive layers;
fabricating a second mask pattern by printing the second mask pattern, using a print unit, on a photomask, the second mask pattern formed by distorting the first mask pattern such that a first probability of the inter-layer contacts or vias not successfully connecting two conductive layers when the second mask pattern is used is greater than a second probability of the inter-layer contacts or vias not successfully connecting two conductive layers when the first mask pattern is used, wherein the second mask pattern is formed by distorting at least one mask window comprised in the first mask pattern by omitting optical proximity correction (OPC) or applying modified OPC to the at least one mask window; and
performing photolithography using the photomask printed with the second mask pattern to form inter-layer contacts or vias such that a difference in proportion between unformed inter-layer contacts or vias and formed inter-layer contacts or vias to short-circuit semiconductor conductive layers among the inter-layer contacts or vias is a first threshold or lower.

7. The semiconductor manufacturing method of claim 6, wherein the second mask pattern is formed by down-scaling a size of at least one mask window comprised in the first mask pattern by applying a scale factor smaller than 1 to the at least one mask window.

8. The semiconductor manufacturing method of claim 6, wherein the second mask pattern is formed by distorting a shape of at least one mask window comprised in the first mask pattern by modifying the shape of the at least one mask window in at least one direction.

9. A semiconductor manufacturing method comprising:

receiving a first mask pattern involved in a process of implanting N inter-layer contacts designed to short-circuit semiconductor conductive layers, N being a natural number and the first mask pattern comprising N mask windows corresponding to the respective N inter-layer contacts;

forming a second mask pattern and printing the second mask pattern on a photomask, fabricating the second mask pattern using a print unit and, the second mask pattern formed by modifying or distorting at least one of a shape and a size of the N mask windows in the first mask pattern such that the second mask pattern has a greater probability than the first mask pattern that a proportion of the N inter-layer contacts or vias does not successfully connect two conductive layers, wherein the second mask pattern is formed by distorting at least one mask window comprised in the first mask pattern by omitting optical proximity correction (OPC) or applying modified OPC to the at least one mask window; and implanting the N inter-layer contacts between the conductive layers using the photomask with the second mask pattern, where it is stochastically determined whether each of the N designed inter-layer contacts short-circuits the conductive layers.

10. The semiconductor manufacturing method of claim 9, wherein the modifying or distorting comprises changing at least one of the shape and the size of the N mask windows such that a difference between a proportion of inter-layer contacts short-circuiting the conductive layers and a proportion of inter-layer contacts not short-circuiting the conductive layers among the N designed inter-layer contacts is smaller than a first threshold.

* * * * *